United States Patent
Charlson et al.

(10) Patent No.: US 9,170,419 B2
(45) Date of Patent: Oct. 27, 2015

(54) REVERSIBLE PIEZOCHROMIC SYSTEM, METHODS OF MAKING A REVERSIBLE PIEZOCHROMIC SYSTEM, AND METHODS OF USING A REVERSIBLE PIEZOCHROMIC SYSTEM

(75) Inventors: Deborah Charlson, Maineville, OH (US); Lisa Clapp, Cincinnati, OH (US); David J. Kozak, Fairfield, OH (US); Paul Merchak, Loveland, OH (US); Mark Ortalano, Cincinnati, OH (US); Russell J. Schwartz, Cincinnati, OH (US)

(73) Assignee: Sun Chemical Corporation, Parsippany, NJ (US)

( * ) Notice: Subject to any disclaimer, the term of this patent is extended or adjusted under 35 U.S.C. 154(b) by 246 days.

(21) Appl. No.: 13/637,707

(22) PCT Filed: Mar. 30, 2011

(86) PCT No.: PCT/US2011/030490
§ 371 (c)(1),
(2), (4) Date: Sep. 27, 2012

(87) PCT Pub. No.: WO2011/123515
PCT Pub. Date: Oct. 6, 2011

(65) Prior Publication Data
US 2013/0017948 A1    Jan. 17, 2013

Related U.S. Application Data

(60) Provisional application No. 61/318,991, filed on Mar. 30, 2010.

(51) Int. Cl.
G02B 26/00        (2006.01)

(52) U.S. Cl.
CPC ............ *G02B 26/004* (2013.01); *G02B 26/007* (2013.01); *Y10T 428/24802* (2015.01);
(Continued)

(58) Field of Classification Search
CPC ..... G02B 26/004; G02B 26/00; G02B 26/007
USPC .................................... 428/195.1; 283/94, 99
See application file for complete search history.

(56) References Cited

U.S. PATENT DOCUMENTS 4,784,932 A    11/1988  Nakamura et al.
5,493,430 A     2/1996  Lu et al.
(Continued)

FOREIGN PATENT DOCUMENTS

| CA | 2 667 704 | 5/2008 |
| FR | 2 698 390 | 5/1994 |
| WO | WO 2010/115803 | 10/2010 |

OTHER PUBLICATIONS

"Critical surface tension and contact angle with water for various polymers" acquired from http://www.accudynetest.com/polytable_03.html?sortby=contact_angle on Oct. 28, 2014.*
(Continued)

*Primary Examiner* — Gerard Higgins
(74) *Attorney, Agent, or Firm* — Frost Brown Todd LLC

(57) ABSTRACT

The present invention provides a reversible piezochromic system that changes appearance upon application of a mechanical force. The reversible piezochromic system includes a cavity defined by a first substrate and a second substrate. The cavity includes at least a first fluid. The first fluid spreads when a mechanical force is applied to the system. The relaxation time of the first fluid depends upon the internal forces of the system. These internal forces at least include the surface energy differences between the substrates and the fluid or fluids, and the rheological properties of the fluid or fluids.

29 Claims, 4 Drawing Sheets

(52) U.S. Cl.
CPC .. *Y10T428/24868* (2015.01); *Y10T 428/24942* (2015.01); *Y10T 428/249995* (2015.04); *Y10T 428/249997* (2015.04)

(56) References Cited

U.S. PATENT DOCUMENTS

| | | |
|---|---|---|
| 5,881,879 A | 3/1999 | Faict et al. |
| 2004/0057021 A1* | 3/2004 | Lassar et al. .................... 353/84 |
| 2005/0104804 A1 | 5/2005 | Feenstra et al. |
| 2006/0159592 A1* | 7/2006 | Andersson et al. ........... 422/100 |
| 2009/0010477 A1* | 1/2009 | Frobisher ..................... 381/386 |
| 2009/0277056 A1* | 11/2009 | Peeters et al. .................. 40/406 |

OTHER PUBLICATIONS

"Optical properties of (Hydroxypropyl)cellulose Liquid Crystals, Cholesteric Pitch and Polymer Concentration" Macromolecules, 1984, vol. 17, p. 1512-1520.*

Supplementary European Search Report dated Jul. 14, 2014 for Application No. EP 11 76 3362.

* cited by examiner

Side View

1A. Equilibrium State

1B. Activated State

1. Top Substrate
2. Bottom Substrate
3. Spacer
4. Fluid 1
5. Fluid 2
6. High Surface Energy Substrate Region Top Mask Bottom Piece (no fluid)

Bottom Piece (with colored fluid)

Composite Structure with Top Piece attached to Bottom Piece (with colored fluid)

Apply Pressure ($t_0$)

Observe at Later Time ($t_1 > t_0$)

Observe at Later Time ($t_2 > t_1$)

Observe at Later Time ($t_3 > t_2$)

Duration of Timing Completed ($t_4 > t_3$)

REVERSIBLE PIEZOCHROMIC SYSTEM, METHODS OF MAKING A REVERSIBLE PIEZOCHROMIC SYSTEM, AND METHODS OF USING A REVERSIBLE PIEZOCHROMIC SYSTEM

This application is a 35 U.S.C. 371 National Stage Entry of International Application No. PCT/US2011/030490, filed Mar. 30, 2011, which claims the benefit of U.S. Provisional Patent Application No. 61/318,991, filed on Mar. 30, 2010, which is hereby incorporated by reference for all purposes as if fully set forth herein. Cross-reference is also made to co-pending PCT patent application No. PCT/US10/53474, titled "PIEZOCHROMIC DEVICE", the contents of which is also fully incorporated herein by reference.

BACKGROUND OF THE INVENTION

1. Field of the Invention

The present invention generally relates to a reversible piezochromic system, and methods of making and using the reversible piezochromic system.

2. Discussion of the Related Art

Reversible chromic devices have a wide variety of applications. They have been heavily employed especially in the field of display technology. The devices are generally able to convey a change in color in response to a specific stimulation.

Reversible chromic devices have for example been known to exist in complicated electrical and mechanical devices. An example of these types of devices includes well known liquid crystal displays. Such displays employ the manipulation of the orientation of liquid crystal materials by application of an electric or electromagnetic field. These types of devices generally require a power source and tend to be heavy, expensive and difficult to operate at times.

Alternatives to these devices have been developed with the use of electrochromic, photochromic, thermochromic or piezochromic devices. In electrochromic devices, the chemical change is induced with the application of an electromagnetic field. In photochromic devices, the change is induced by exposure to light. In thermochromic, devices the change is caused by a change in temperature. In piezochromic devices, by contrast, the change is induced by pressure.

Common to these systems, however, is their dependency on the internal chemical change that occurs within a given substance. This makes these types of devices less desirable in reversible applications as they cannot be easily or accurately controlled.

For example, in piezochromic devices, the color of a piezochromic substance is attributed to the absorption of light in specific regions of the excitation spectrum of the substance which causes a jump of an electronic transition from a ground state to a state of higher energy. When pressure is applied to the substance, these energy states are disturbed. By so doing, a change in color of the substance is noticed. An example of this type of device is described in WO 2005/092995, which discloses reversible piezochromic system used in the field of printing inks to protect banknotes from forgery. The system comprises a combination of an electron donating compound and an electron accepting compound. The electron donating compound is an ionochromic substance such as a pH sensitive dye. The electron accepting compound exhibits an acidity that is high enough to develop a color change, but low enough to allow for a reversible color change. Although very useful for some applications, this type of application also presents some issues relating to fast fading of the color (e.g., one or two minutes). Such relaxation times are undesirable in the field of forgery or monitoring devices.

WO 2010/115928 also describes a reversible piezochromic system used for forgery protection. The system includes optically contrasting pigment particles oriented in a film or a coating of an elastic polymer. When the elastic polymer is compressed or elongated, the density and orientation of the pigment particles change to produce a visible color change. One of the drawbacks of this device is the inability to control the duration of the color change.

The Piezochromic effect has also been studied with respect to liquid crystals in devices without the use of electrical components. Here, the molecules of a liquid crystal are disposed on a sheet or between two substrates. When pressed upon, a disruption of the liquid crystal's alignment causes a color change. The produced color, however, does not exhibit a high contrast ratio, and the relaxation time for the color to revert back to its equilibrium state remains very difficult to control.

Reversible devices often times are necessary in more simple applications. They must not only operate properly, they must also be easy and inexpensive to manufacture. The use of color changing chemical compositions, or electrical devices is less desirable in such circumstances due to their complexity and cost.

An exemplary, alternative to such costly devices was introduced in U.S. Patent Publication No. 2009/0211642 which describes a monitoring device that uses an observable fluid. The fluid moves between a first and second reservoir to indicate a change in color. However, difficulties in signal detection may exist because all of the fluid must drain from one reservoir to another reservoir until the fluid is no longer visible in the drained reservoir. Thus, relying on pressure to remove all of the fluid may be insufficient. Also, the device tends to be large in view of its two reservoirs and would not be suitable in smaller devices. Further, manufacturing of the device is challenging in view of its complex structure.

For at least these reasons, a need exists in the art for an improved, reversible piezochromic system that can easily be manufactured and is relatively inexpensive, but that can still provide an appropriate level of control over its functionality.

SUMMARY OF THE INVENTION

A reversible piezochromic system may exhibit a reversible change in appearance after a predetermined external force, such as pressure, is applied to the system. This change in appearance is distinguishable from an original appearance prior to the external force being applied to the system. After the external force is removed, and after a set relaxation time, the system returns to its original appearance.

An advantage of an exemplary embodiment may be for a reversible piezochromic system that does not necessarily require electrical components or a reaction at a molecular level to change an appearance of the system. In other words, the color change may be dependent primarily upon internal forces as defined by the physiochemical nature of the materials of construction of the system.

Another advantage may be the ability to control the time the new image is maintained.

Exemplary embodiments may provide a piezochromic system that displays a vibrant color during activation by way of pressure for a controlled period of time.

Another exemplary embodiment may create a controllable image using surface energy differences between fluids and substrates.

Another exemplary embodiment provides a low cost, lightweight, easy to manufacture, and easy-to-use reversible piezochromic system.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, there includes a reversible piezochromic system comprising a first substrate, a second substrate, and a cavity defined by an inside surface of the first substrate and an inside surface of the second substrate. At least a first fluid is disposed inside the cavity. Upon application of a force to the system, the first fluid spreads from an equilibrium state to an active state. Upon relief of the force on the system, the first fluid contracts to the equilibrium state.

In another exemplary embodiment describes a method for making a reversible piezochromic system. One of the steps is selecting a first and second substrate in which an inner surface of at least one of the first and second substrates has a defined surface energy. An addition step includes encapsulating at least one fluid within a cavity formed by the first and second substrates. A further step includes selecting at least one fluid with a surface energy that is greater than a surface energy of the inner surface of the first and second substrates.

A further exemplary embodiment describes a method of using a reversible piezochromic system. The method includes a step of applying a force to the system to cause a first fluid to spread. A further step includes discontinuing the application of force for a sufficient time to allow the fluid to at least partially contract.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the Drawings.

DETAILED DESCRIPTION OF THE ILLUSTRATED EMBODIMENTS

Figure 1A:
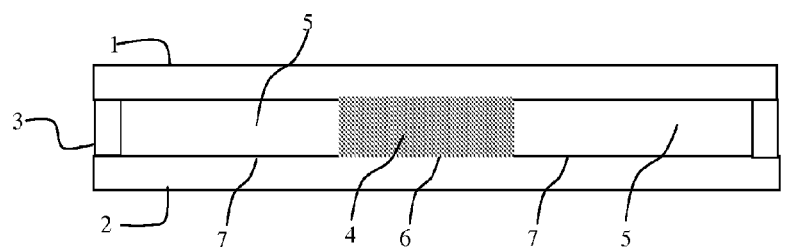
FIGS. 1A and 1B are side views of an exemplary piezochromic system in an equilibrium state and an activation state.

Reference will now be made in detail to embodiments of the present invention, examples of which are illustrated in the accompanying drawings.

An exemplary reversible piezochromic device is one wherein the device contains two substrates and one or more fluids. The interior of at least one substrate, and optionally both substrates, may be patterned so that a surface of at least one substrate may have both high surface and lower surface energy areas. Alternatively, the interior may include a low surface energy coating and a fluid that has a high contact angle with the substrate or coated substrate on one or both substrates. The device is assembled so that the interior surfaces of two substrates define a cavity. The cavity may contain at least a first fluid. Optionally the cavity may contain a second or more fluids. If only one fluid is present, the remaining space in the cavity may include a vacuum. The first fluid may be a high surface energy fluid that preferentially wets a surface with a high surface energy, and does not readily spread or wet a surface with a low surface energy. The high surface energy fluid may be tinted with either a pigment or a dye. The second or more fluids may be low surface energy fluids which can readily spread or wet surfaces with high and low surface energy. When pressure is applied to the device, the high surface energy fluid spreads inside the cavity. Once the pressure is removed, the high surface energy fluid recedes back to an equilibrium state at a rate that is controlled by selecting appropriate surface energies of the fluids with the surface of the substrate, rheological properties of the fluids, and interfacial energies between the fluids.

An advantage of the exemplary piezochromic systems described herein is that they may be designed so that it may be possible to control relaxation time of the fluid or fluids within the system. For purposes of this disclosure, the relaxation time is understood as the time it takes for a fluid to return from a state of activation (i.e., when the high surface energy fluid is spread out), to a state of equilibrium (i.e., when the high surface energy fluid is in a non-spread out state). By properly controlling the relaxation time, it is possible to implement the piezochromic system to various applications as described in more detail below.

The reversible piezochromic device or system may be designed to visually change color when force is applied to the device and returns to the equilibrium state. The appearance may be altered from a state of equilibrium to a state of activation via an applied external force (e.g., mechanical pressure). This force may be applied at a direction normal or tangential (shear with a normal component) to the surface of the device. The magnitude of the applied force and the duration in the area for which it is applied would preferably be sufficient enough to disturb the state of equilibrium resulting in a change in appearance through spreading of the high surface energy fluid.

There are a number of approaches that can be employed to construct a reversible piezochromic device of the current invention. Internal forces used to control the state of equilibrium may be considered. An example of the internal forces may be capillary pressure. Another example of the internal forces may be Young-Laplace pressure. Another example of the internal forces may be viscoelastic forces. Another example of the internal forces may be electromagnetic. In a further example, the forces may be magnetic. Another example of the internal forces may be surface energy. In yet a further example, the forces may be gravitational. Upon removal of the applied external force, these internal forces then dominate causing the fluid to contract back to the equilibrium state. In one embodiment, the magnitude of these forces control the relaxation time or the time that is required for the device to return from the activated state (i.e., where color shift has occurred due to application of the force) to the equilibrium state (i.e., where there is no change in appearance over time when there are no applied forces).

Figure 1B:
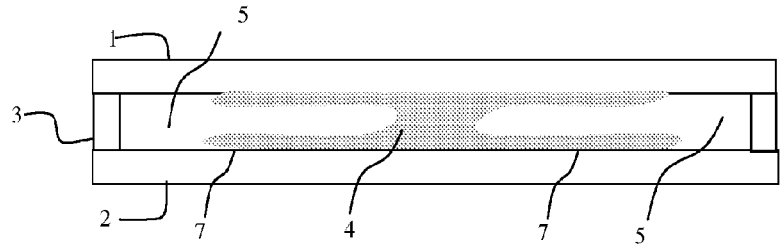

In one embodiment of the current invention, as illustrated in FIGS. 1A-1B, the device consists of a lower substrate 2, a clear upper substrate 1, a colored fluid 4, and a non-colored or colored fluid or gas 5. When a force, either normal or tangential, is applied to either or both substrates, the colored fluid 4 spreads across the device resulting in a color change (e.g. the activated state). The lower substrate, and optionally, the upper substrate, is patterned with coatings which create higher and lower surface energy areas 6 and 7 on the substrate's inner surface(s) so that once the applied force is removed, the high surface energy fluid may contract back to its original location proximate to the higher surface energy area 6 of the substrate(s). The clear upper substrate may be transparent. The clear upper substrate may be semitransparent. The upper substrate may be unpatterned. Alternatively, the upper substrate may also include a printed pattern. The printed pattern may for example provide a signal. The printed pattern may provide an image. The printed pattern may provide text. The printed pattern may provide a logo. The high surface energy fluid may become visible at least when in the active state thus showing a color change. The bottom substrate may be opaque. The bottom substrate may be transparent. The bottom substrate may be semitransparent. The bottom substrate may be unpatterned. The bottom substrate may have a printed pattern. The printed pattern may be a signal. The printed pattern may be an image. The printed pattern may be a text. The printed pattern may be a logo.

For purposes of this disclosure, the two substrates are exemplified as upper and lower substrates, however, the upper and lower substrates are not limited by their spatial orientation and may therefore be referred to as first and second substrates. Both first and second substrates, are generally adjacent to one another so as to form a cavity. The first and second substrates may be horizontally oriented. Alternatively the substrates may be vertically oriented. The first and second substrates may also be oriented at any angle between a horizontal or vertical configuration.

The time for the high surface energy fluid to return to equilibrium may be controlled by the difference in surface energy between areas 6 and 7 and between that of fluid 4 and fluid 5. Additionally, in the event both fluids 4 and 5 are both liquids, the time to return to the equilibrium state from the active state is also controlled by the interfacial tension of fluid 4 and fluid 5. A greater difference in these surface energy properties results in a shortened relaxation time, whereas a lower difference in these surface energy properties results in a lengthened relaxation time.

In another embodiment, at one substrate includes a surface having a low surface energy. The substrate could be an unpatterned substrate. One example could be a substrate made of polytetrafluoroethylene (PTFE). Alternatively, the substrate could be patterned with a polymeric coating(s). The low surface energy coating could be PTFE. The interior cavity contains a high surface energy fluid that is colored which contracts to the equilibrium state at a rate that is determined by the surface energy differences between the fluid and the substrates. The cavity may also contain a second fluid that is a low surface energy fluid. The low surface energy fluid may be either colored or non-colored liquid or may be a gas. The rate that the high surface energy fluid returns to the equilibrium state is also influenced by the interfacial tension between the fluids.

In another embodiment, the interior cavity is filled with a low surface energy fluid and a high surface energy fluid. The low surface energy fluid preferentially wets the interior of the substrate or substrates, and the high surface energy fluid, which has a high contact angle with the low surface energy region of the substrate, contracts to the smallest area to minimize the energy. When an external force is applied, the high surface energy fluid spreads and after the force is removed it contracts to the equilibrium state at a rate that is dependent on the interfacial tension between the fluids and surface energies of the substrates. It is also possible that a third component could exist in the system such as a gas. The gas could be air or vapor.

The contact angle is the angle at which a fluid meets a solid surface. In one embodiment, the high surface energy fluid has a contact angle greater than 85° with the lower surface energy area of the substrate. The contact angle may also range between 90° and 180°. The lower surface energy fluid has a contact angle between 0° and 85° with the lower surface energy area of the substrate. The contact angle is measured using a VCA Optima XE from AST Products, Inc. The droplet size of the fluid for these measurements is 0.5 to 1 µL.

In another embodiment, the relaxation time may be controlled by the rheological properties of the fluid. The rheological properties are determined by the fluid composition and may include rheology modifiers. The rheological modifiers may be selected from any polymers or other materials that are soluble or partially soluble or insoluble in the selected solvents. The solvents are selected to have surface energies that show preferential wetting with the pattern of the equilibrium state as compared to the area wetted in the activated state. Polymeric dyes can act as both a colorant and a rheological modifier. Also, the addition and stabilization of pigments as colorants may also influence the rheological properties of the fluid or fluids.

In yet another embodiment, the time to return to the equilibrium state may be controlled by the cohesive forces and viscoelastic properties of the fluid or fluids, the surface energy differences of the patterned substrate or substrates, and the surface energy of the patterned areas with the fluid or fluids in the interior of the device. Alternatively, the time to return to the equilibrium state may be controlled by the cohesive forces and viscoelastic properties of the fluid or fluids and the surface energy differences with a low surface energy substrate.

The system may be formed in any shape or dimension including but not limited to a square, rectangular or circular shape. The system may also be formed of any size. FIG. 1A illustrates an exemplary embodiment of a reversible piezochromic system. The system includes a first and second substrate, namely, an upper substrate 1, a lower substrate 2. One or more spacers 3 are positioned between the two substrates.

The substrates may be flexible and should be able to withstand a mechanical or other pressure force applied thereto. Each of the upper and lower substrates may be clear. Each of the upper and lower substrates may be opaque. Each of the upper and lower substrates may be transparent. Each of the upper and lower substrates may be semitransparent. Either the top and/or bottom substrates may further include a signal to indicate a color change to an end-user. Either the top and/or bottom substrates may further include an image to indicate a color change to an end-user. Either the top and/or bottom substrates may further include a text to indicate a color change to an end-user. Either the top and/or bottom substrates may further include a logo to indicate a color change to an end-user.

A transparent face of at least one substrate would allow for visual inspection of the liquid medium contained within the device. Alternatively, a semi-transparent face of at least one substrate would allow for visual inspection of the liquid medium contained within the device. The transparent or semi-transparent face may account for a small portion of the overall device or may account for the whole device. The face may comprise of a wide variety of organic optically transparent polymeric materials. The face may comprise of a wide variety of organic optically transparent or semi-transparent polymeric materials. The face may comprise of a wide variety of optically inorganic materials, for example, glass, metal or ceramics. Examples of face materials include polyamide, polyimide, polyethylene, polypropylene, polycarbonate, polyester, fluorinated ethylene propylene (FEP), PVC (polyvinyl chloride), acrylics, polystyrene, and polyethylene terephthalate (PETG) (amorphous copolyester). The transparent face may be made from a mixture or layering of polymers. Alternatively, the semi-transparent face may be made from a mixture or layering of polymers Additionally, the substrate may be composed of high molecular weight organic materials made of natural and synthetic origin. Alternatively, the substrate may be composed of inorganic materials made of natural and synthetic origin. The inorganic material may be glass. The inorganic material may be a metal. The inorganic material may be a ceramic. Examples of high molecular weight synthetic organic materials include both rigid and flexible: polyolefins such as polyethylene, polypropylene, polybutylene, polyisobutylene and poly-4-methyl-1-pentene, polyolefin copolymers such as Luflexen® (Basell), Nordel® (Dow) and Engage® (DuPont), cycloolefin copolymers such as Topas® (Celanese), polytetrafluoroethylene (PTFE), ethylene/tetrafluoroethylene copolymers (ETFE), polyvinylidene difluoride (PVDF), polyvinyl chloride (PVC), polyvinylidene chloride, polyvinyl alcohols, polyvinyl esters such as polyvinyl acetate, vinyl ester copolymers such as ethylene/vinyl acetate copolymers (EVA), polyvinyl alkanals such as polyvinyl acetal and polyvinyl butyral (PVB), polyvinyl ketals, polyamides such as Nylon® [6], nylon [12] and nylon [6,6] (DuPont), polyimides, polycarbonate, polycarbonate copolymers and physical blends of polycarbonates with acrylic-butadiene-styrene copolymers, acrylonitrile-styrene-acrylic ester copolymers, polymethyl methacrylates, polybutyl acrylates, polybutyl methacrylates, polybutylene terephthalates and polyethylene terephthalates, acetate polyesters such as polyethylene terephthalate (PET), polybutylene terephthalate (PBT) and polyethylene naphthalate (PEN), copolymers, transesterification products and physical mixtures (blends) of the aforementioned polyalkylene terephthalates, poly(meth)acrylates, polyacrylamides, polyacrylonitrile, poly(meth)acrylate/polyvinylidene difluoride blends, polyurethanes, polyvinyl fluoride, natural rubber, synthetic rubber, polystyrene, styrene copolymers such as styrene/butadiene copolymers, styrene/acrylonitrile copolymers (SAN), styrene/ethyl methacrylate copolymers, styrene/butadiene/ethyl acrylate copolymers, styrene/acrylonitrile/methacrylate copolymers, acrylonitrile/butadiene/styrene copolymers (ABS) and methacrylate/butadiene/styrene copolymers (MBS), polyethers such as polyphenylene oxide, polyether ketones, polysulfones, polyether sulfones, polyglycols such as polyoxymethylene (POM), polyaryls such as polyphenylene, polyarylenevinylenes, silicones, ionomers, thermoplastic and thermoset polyurethanes and mixtures thereof, or layers thereof.

A cavity may be formed between the upper and lower substrates. Any method to form a cavity may be employed. In an exemplary embodiment as shown in FIG. 1A one or more spacers may be located between the upper and lower substrates to form a cavity. In the alternative, the upper and lower substrates may be connected without the use of a spacer and still form a cavity.

One or more fluids may be included inside the cavity. In the exemplary embodiment shown in FIG. 1A, a first fluid 4, being a high surface energy fluid, and a second fluid 5, being a low surface energy fluid, are present in the cavity. For purposes of this disclosure, a high surface energy fluid is a fluid whose surface energy is higher than the surface energy of the substrate, and when the substrate includes areas of differing surface energies, then the high surface energy fluid has a surface energy that is sufficiently high to preferentially wet a surface with a relatively high surface energy while not readily spreading or wetting a surface with low surface energy. A low surface energy fluid is one whose surface energy is lower than the surface energy of the high surface energy fluid. The low surface energy fluid is also one that more readily wets surfaces with relatively higher and lower surface energies. The fluids may be colored or non-colored, transparent, semi-transparent, or opaque, and generally may be liquids, gels or gasses. The fluids may have purely viscous or viscoelastic properties which contribute to their flow rate. In one example, the high surface energy fluid may be a liquid and the low surface energy fluid may be gas. The high surface energy fluid may also be colored. The high surface energy fluid may be a simple fluid or a mixture of liquids.

The relaxation time of the system may depend on various factors. The relaxation time may depend on internal forces of the substrate(s) and fluid(s) of the reversible piezochromic system. The internal force may include capillary pressure. Alternatively, the internal force may include Young-Laplace pressure. The internal force may include viscoelastic forces. The internal force may include surface energy. The internal forces may be gravitational. However, the device when inactivated or activated, may be independent of spatial orientation due the surface energy forces exceeding gravitational forces. In particular, it was discovered that the relaxation time may be closely controlled with the manipulation of the relationship between the volume and height of the cavity. The relaxation time may also be controlled by manipulating the volume and height of the fluids inside the cavity. The relaxation time may also be affected by controlling the pressure inside the cavity. The relaxation time may also be affected by selecting the appropriate viscosity of the fluids inside the cavity. The relaxation time may also be affected by selecting the rheological properties of the fluids. The relaxation time may also be affected by patterning the surface energy of the substrates' surfaces inside the cavity. The relaxation time may also be affected by the interfacial tension between the fluids in the cavity. The relaxation time may also be affected by the surface tension between the fluids in the cavity. If one of the fluids is a gas, the relaxation time may be affected by selecting the fluids with appropriate surface tension. While any of these factors alone may provide a degree of control to the relaxation time, it should be understood that the exemplary embodiments described herein may include any one or more of these factors designed to work together in providing the desired control of the system.

The height of the cavity, defined by the inner surfaces of the first and second substrate, may be modified in a number of ways. The volume of the cavity may also be modified in a number of ways. For example, the height of the cavity dimensions may be achieved by using a printed structure on the substrate or by using sequentially laminated films. The printed structure may be a predefined, unitary material that is disposed on the substrate to obtain a fixed height. The laminated films are formed from materials that are adhered onto the substrate, in a sequential manner, to obtain a desired height of the cavity.

Although the cavity may have different heights, its dimensions may need to be adjusted in view of the overall size of the system. For example, as shown in Table 1, when the height of the system ranges from about 0.6 mm to about 0.725 mm, the respective cavity heights may range from about 0.35 mm to about 0.475 mm. The cavity volume will also generally be greater than the volume of the high surface energy fluid located therein. For an exemplary disc-shaped device of FIG. 1A with an outer diameter of 12 mm, the volume of the high surface energy fluid may range from about 0.001 to 0.1 milliliters. The volume of the high surface fluid may also range from about 0.01 to 0.05 milliliters. For example, upon activation as shown in FIG. 1B, the height of the high surface energy fluid may not be uniform inside the cavity of the system. The non-uniform height of the high surface energy fluid may be attributed to different surface energies existing at different locations of the substrate in contact with the high surface energy fluid. The exemplary cavity heights shown in Table 1 below, may generally be selected to achieve cavity volume that may accommodate a total high surface energy fluid volume of approximately 0.001 to 0.1 milliliters.

TABLE 1

| Device Type | Timing (Average Range) | Device Height (Total; Inner Cavity)** |
| --- | --- | --- |
| Red 1 Fluid (Exs. 1 & 3) | 45-55 Minutes* | 0.6 mm; 0.35 mm |
| Red 2 Alternate Fluid (Exs. 1 & 3) | 75-85 Minutes | 0.6 mm; 0.35 mm |
| Blue 2 Fluid (Exs. 1 & 3) | 55-65 Minutes | 0.6 mm; 0.35 mm |
| Red Dye Based Fluid (Exs. 2) | 2-5 Minutes | 0.725 mm; 0.475 mm |
| Red Dye Based Alternate Fluid (Exs. 2) | 30-60 Seconds | 0.6 mm; 0.35 mm |

*Timing is measured from device activation (initial application of force) until the colored indicator fluid returns to its equilibrium state and position, which is hidden under the printed colored image (which acts as a mask to hide the fluid).
**The total device height is determined by measuring the outer dimensions of the device. The inner cavity height is the dimension between the two film substrates on the interior of the device.

As stated earlier, selecting the height of the cavity may be one of plural factors for controlling the relaxation time of the high surface energy fluid in the system. In addition, selecting the volume of the cavity may be one of plural factors for controlling the relaxation time of the high surface energy fluid in the system. For example, a large cavity height may be desired to reduce the relaxation time of the high surface energy fluid, while a short height may be used to increase the relaxation time of the high surface energy fluid. To ensure proper control of the relaxation time it may be desirable to set the cavity height so that the high surface energy fluid within the cavity always maintains in contact with one or both of the upper and lower substrates. Also, a large disparity in size between the cavity volume and the volume of the high surface energy fluid may result in undesired effects. For example, setting the volume of the cavity to be much greater than that of the high surface energy fluid may result in its shift with respect to the gravitational forces normally acting on the system. This may lead to loss of control over the relaxation time of the fluid or fluids. Thus, the volume of the high surface energy fluid may be directly proportional to the volume of the cavity.

Another factor that may be used to control the relaxation time of the high surface energy fluid is the pressure inside the piezochromic system. Low pressure within the system may result in a longer relaxation time while a high pressure may decrease relaxation time. The resulting pressure inside the system may change depending on the location in which the system is used. For example, at a high altitude, the pressure inside the system may be low when compared to the pressure in the system at sea level. In contrast, in areas where the atmospheric pressure is much greater than at sea level, the system would exhibit more force on these areas.

To control the pressure inside the system, the cavity may be partially or completely sealed. There are numerous ways to form a completely sealed or a partially sealed system. Thus, the method employed should not be view as limiting. In an exemplary embodiment an adhesive may optionally be included between the upper and lower substrate independent of the use of a spacer. To completely seal the cavity, the adhesive may be provided around the full perimeter of the cavity. A completely sealed system may be advantageous in circumstances where the overall pressure is necessary to induce a fast relaxation time.

There are different ways in which the cavity may be partially sealed. In one embodiment, a partially sealed cavity may be obtained by providing the adhesive only partially around the cavity. In an alternative embodiment, a partial seal may be obtained by forming a complete seal around the perimeter of the cavity and puncturing the surface of either the upper and/or lower substrates or by including gaps in the spacers between the substrates. Puncturing may be advantageous in instances where it is desirable to eliminate the pressure differential (e.g., high altitudes).

Control of the relaxation time of the high surface energy fluid may also be obtained by patterning the cavity or inside surfaces of the upper and lower substrates. For ease of reference, the pattern in the following exemplary embodiments will be described as being present on the inside surfaces of both substrates, however, these examples should not be viewed as limiting. Instead, it should be understood that the patterns may also be formed on only one of the upper or lower substrates. Further, it should be understood that the following discussion of surface energy that relates to the surfaces or the substrates refers to the inside surfaces of the upper and/or lower substrates, e.g., the top and/or bottom surfaces of the cavity.

As shown in FIG. 1A, the lower substrate 2 may be patterned to include a surface energy area 6 ("higher surface energy area") whose surface energy is higher than the surface energy of surface energy area 7 ("lower surface energy area"). The upper substrate 1 may also similarly be patterned. The design of the patterns may be chosen depending on the desired function of the system. In the exemplary embodiment shown in FIG. 1A, the higher surface energy area is shown as being in a central location surrounded by the lower surface energy area. In this manner, it is possible to control the high surface energy fluid to spread from the central location and contracts back toward a center during relaxation. In yet another exemplary embodiment, the patterns may include a plurality of continuous or discontinuous portions that identify a series of compartments.

There are many different methods by which patterns on substrate surfaces may be formed, and the following examples should not be viewed as limiting. The patterned surfaces may be continuous or non-continuous. In an exemplary embodiment, a continuous or a non-continuous coating with defined surface energies may be used to generate a pattern. By doing so, the system may have a singular, continuous patterned portion surrounded by an unpatterned portion. In an alternative embodiment, the system may have plural, continuous or discontinuous patterned portions of one or more surface energy levels. In yet another embodiment, the substrate may have a uniform surface energy across at least the entire inner surface area of the substrate that affects the relaxation time of the high surface energy fluid.

There may be different ways to pattern a substrate to create a desirable surface energy thereon. In one example, the substrate may have a surface treatment to create a surface energy thereon. In another example, the substrate may already have the desired surface energy. In another example, the substrate may be coated to establish the desired surface energy. Alternatively, the patterns on the substrates may be formed using one or more polymeric coatings having different surface energies relative to each other and with respect to the substrates.

Examples of the polymeric coating for patterning the inner surface of the substrate with respect to the cavity include: fluoropolymers, silicone polymers, siloxanes, polyacrylates, polymethacrylates, polyvinyl ethers, polyurethanes, polyureas, polypropylene, polyethylene, polyester, polyimide, polyvinyl cellulose, polyvinyl chloride, polycarbonate, polyethylene terephthalate (PET), polyamide, polyimide, or treated substrates as opposed to coating (e.g. corona-treated, plasma-treated, or silane treated), or polymers containing surface energy modifiers (e.g. surfactants, including fluorosurfactants), and mixtures or combinations thereof. Polymeric coatings may also be created in-situ by energy curable monomers and oligomers of similar materials noted above. In an exemplary embodiment, the coating is a fluoropolymer.

In an exemplary embodiment, a single polymeric coating is used on either one or both substrates to form desired patterns. In an alternative embodiment, multiple polymeric coatings may be used and selected so as to have different surface energies. For example, a first area of the substrates may be coated with a first polymer coating that has a lower surface energy than the surface energy of a second polymer coating that is provided over a second area of the substrates.

Another method of affecting the relaxation time of the fluid or fluids by way of patterning the substrate is by creating hydrophilic and/or hydrophobic areas on the substrate. In one exemplary embodiment a substrate may include a hydrophilic area(s) and a hydrophobic area(s). In another exemplary embodiment a substrate may include a hydrophobic surface whose hydrophobic properties vary from one area to the next. Also, in some instances a substrate may include a hydrophilic surface whose hydrophilic properties vary from one area to the next. Like multiple polymer coatings having different surface energies, the hydrophobic and hydrophilic properties of a surface can similarly affect the fluids' behavior with respect to the relaxation time as each exhibits a different surface energy. The hydrophilic areas may exhibit a higher surface energy. The hydrophobic areas may exhibit a lower surface energy. In an exemplary embodiment, the areas may be hydrophobic and hydrophilic. Alternatively, patterns may be created by varying the degree of hydrophobic or hydrophilic properties of the surface. For example, the fluid or fluids have a greater attraction to one area over the other in view of its varying hydrophilic characteristics.

In yet a further exemplary embodiment, the interior surfaces of the upper and lower substrates may exhibit a uniform surface energy throughout. The surface energy of the substrates may also be substantially lower than the surface energy of the high surface energy fluid. This is different from a system having multiple patterns of different surface energies wherein during the activation state, the high surface energy fluid spreads from one or more predetermined, fixed higher surface energy areas. Instead, when the surface energy is uniform throughout the substrates' surface, the high surface energy fluid forms a droplet on a random area of the substrates when no force is applied to the system, and spreads over the substrates when a force is applied. The relaxation time may be designed to last for a prolonged period of time by modifying the relationship of the surface energy between the surfaces of the substrates and that of the high surface energy fluid. Ultimately, the system may allow for the high surface energy fluid to return to the equilibrium state. However, the location of the high surface energy fluid at equilibrium would not necessarily be a fixed position and instead may be a new random location. This embodiment may be useful where it is not necessary to maintain the high surface energy fluid at a specified area during equilibrium. One such example could be a sports tape that may be used to resolve disputes in a tennis match to determine if the tennis ball was in or out of bounds. In such an embodiment, it is only necessary to show that the high surface energy fluid is in the active state (i.e., spread out) or at equilibrium (i.e., not spread out) to indicate whether the ball hit the tape.

In another embodiment, the inner surface of the substrate, located on an inner cavity, may have a patterned coating to improve functionality. The pattern may be formed of any shape or size on the inner surface. In another embodiment, the inner surface of the substrate may have plural patterned coatings thereon. In yet a further embodiment, the patterned coating may be visible. Alternatively, the patterned coating may be invisible. The coating may be colored. The coating may be non-colored. The coating may be opaque. The coating may be transparent. The coating may be semi-transparent (translucent).

In alternative embodiments, the patterned coating on the inner surface of the substrate, located on an inner cavity, may be a permanent coating to provide long-term operational stability. In an alternative embodiment, the patterned coating may be a transient coating. In the latter case, for example, the relaxation time of the system may change to a new relaxation time after the system has been used a predetermined number of times. For example, a patient may be instructed to use a pharmaceutical device containing the reversible piezochromic system at different intervals (i.e., once a day for the first week, and then every other day for the following week). By doing so, the patient will know when to take the next prescribed dosage. In a further embodiment, the system could be designed so that the change continues until it is no longer reversible. When the system is no longer reversible, the device can be disposed.

Another embodiment, the patterned coating of the inner surface may be a combination of permanent and transient coatings.

In another embodiment, the patterned coating of the inner surface may be performed by adding material. The patterned coating may also be performed by removing material. The patterned coating may also be performed by chemically modifying the surface of the substrate. The patterned coating may be performed by any of combination of the above-mentioned ways. A chemical modification may be of an oxidation and reduction treatment including but not limited to a plasma treatment. The chemical modification may be of an oxidation and reduction treatment including but not limited to a corona treatment. The chemical modification may be of an oxidation and reduction treatment including but not limited to a flame treatment. Removal of material may by thermal methods, such as laser ablation, or by washing, such as by solvent etching. Material may be added to the substrate via printing (e.g., ink jet, flexographic, gravure and lithographic). Material may be added to the substrate via coating (e.g., dip, spin and bar). Material may be added to the substrate via adhering another solid film to a portion of the substrate (e.g., lamination). The material may be added in a solid continuous film. The material may be added in discontinuous film (e.g., when dot patterns are applied that do not flow together to form a solid continuous film in printing). The material may be applied from an aqueous system. The material may be applied from a non-aqueous system. Non-aqueous systems include solvent based, reactive or 100% solids. The film modification may be of a polymeric, non-polymeric or a combination of the two. In another embodiment, a modification may be made to the entire substrate or to a pattern (design) on the substrate, and then afterwards, a portion may be removed.

In another embodiment, designs of any shape, size, position, color, texture and transparency may be applied to the outer surface of the upper and/or the lower substrate of the device.

Selecting the ideal high and low surface energy fluids in view of the patterned or unpatterned substrates may further assist in controlling the relaxation time of the fluid. For example, the relaxation time may depend upon the cohesive forces and viscoelastic properties of the fluid or fluids and the surface energy differences with a low surface energy substrate.

Different fluids may be selected depending upon the desired rate of relaxation of the system. The fluids may be selected in view of their viscosity. The fluids may be selected in view of their rheological properties. The fluids may be selected in view of their cohesive forces. The high surface energy fluid is selected to have a higher surface energy than the surface energy of the low surface energy fluid. If the high surface energy fluid and the low surface energy fluid are both liquid, then the fluids may further be selected so that the interfacial tension between them is sufficiently high so that the liquids are substantially immiscible.

If the low surface energy fluid is a gas, then high surface energy fluid may be selected based on the appropriate surface tension for the desired function of the system. An exemplary fluid that is not liquid is air.

Generally, fluids with high viscosity may be better suited as high surface energy fluids for slow acting systems where it is desirable to maintain a prolonged relaxation time. Conversely, low viscosity fluids may be better suited for fact acting systems with reduced relaxation times.

The viscosity of the fluids in the system may be independent or dependent of temperature. When the viscosity is independent of temperature, uniform device characteristics such as relaxation time can be achieved over a range of temperatures. If the device is to be used at a specified temperature the fluids may also be selected in consideration of their viscosity at the specified temperature.

All rheological properties, including the temperature profiles and the shear rate behavior, are measured using a TA Instruments AR-G2 Rheometer with a cone and plate geometry. The cone and plate are of standard steel with a 40 mm 2° cone and a truncation gap of 57 μm. The shear rate is set to 1 $s^{-1}$. An equilibration is pre-formed for 1 to 2 minutes for all measurements, but there is no pre-shear step. For the temperature profiles, the ramp is set to 2.5° C./minute. The oscillatory measurements were run at 25° C. and a controlled stress of 0.6 Pascals.

Figure 11:
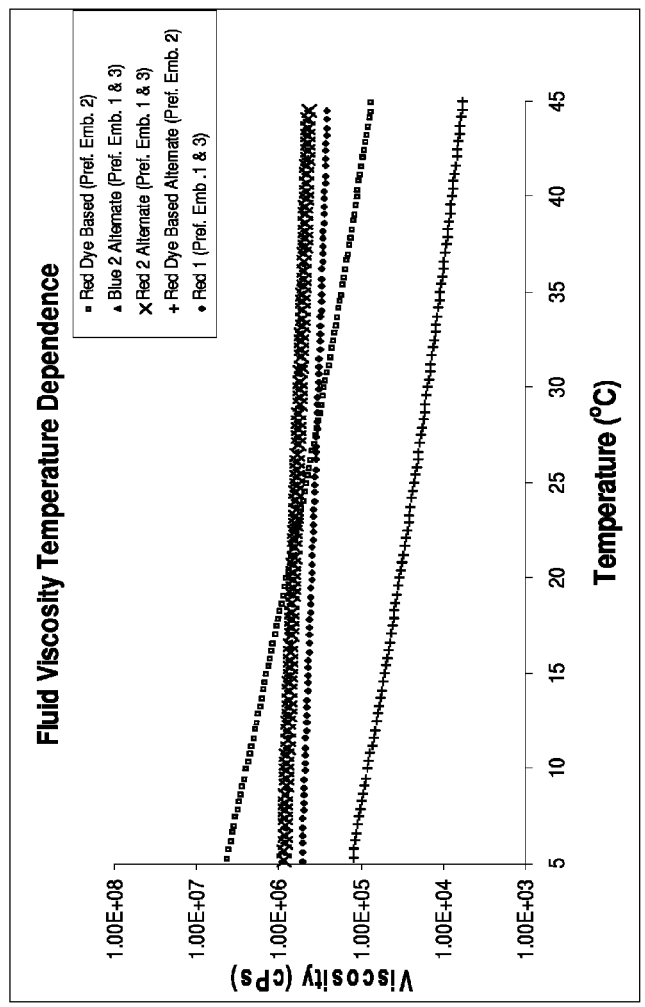
FIG. 11 illustrates a graph of viscosity versus temperature for different fluids.

FIG. 11. provides a graph in logarithmic scale describing viscosities of five fluids with respect to temperature. The viscosities may range from approximately 5,000,000 cPs to approximately 100 cPs over a temperature rang of 5 to 45° C. As shown, some fluids appear to have a viscosity that is substantially independent of temperature. This will allow the timing device to function equally over a wider temperature range. There are other cases where the fluids are more dependent upon temperature. This may be beneficial in instances where a fluid with a greater viscosity variation over temperature is required.

As shown in the graph, "Red Dye Based" appears to fluctuate in viscosity with respect to temperature. The viscosity of "Red Dye Based" at 5 and 45° C. is about 5,000,000 cPs and about 75,000 cPs, respectively. Red Dye Based exhibits the highest viscosity of all of the samples at 5° C. "Red Dye Based Alternative" exhibits a similar trend as "Red Dye Based". The viscosities of "Red Dye Based" and "Red Dye Based Alternative" generally depend upon temperature.

"Blue 2 Alternate" and "Red 2 Alternate" exhibit the highest viscosities of all tested samples at 45° C. Their respective viscosities at 45° C. are approximately 4,500,000 cPs. In addition, their viscosities remain essentially constant from 5 to 45° C. "Blue 2 Alternate" and "Red 2 Alternate" are relatively independent of temperature. The viscosity of "Red 1" is also relatively independent of temperature.

The viscosity of the high surface energy fluid may influence the pressure required to disturb the equilibrium state and the relaxation time. Higher viscosities generally require more force to induce a change in appearance of the system. In addition, higher viscosities generally translate to longer relaxation times. Thus, the inventors may select fluids with specific, known viscosities, taking into consideration the surface energies of the patterned or unpatterned substrate or substrates, in order control the relaxation time of the system.

The relaxation time for an appearance change may range from milliseconds to minutes. The relaxation range may be in the range of hours. The relaxation range may be in the range of days. The relaxation range may be in the range of months. The relaxation range may be in the range of years. The range for a slow acting system may range from 45 minutes to 48 hours. As shown in Table 1, a slow acting system may range from 45 minutes to 85 minutes. As shown in Table 1, a fast acting system may range from 30 seconds to 45 minutes.

With respect to the fluids used in the system, the high surface energy fluid may be a single liquid. Alternatively, the high surface energy fluid may be a mixture of liquids. Exemplary liquids that may be used in the high surface energy fluid include silicone oils. The silicone oil may include polydimethylsiloxane. Alternatively, the silicon oil may include hydrocarbon or mineral oils. In yet another embodiment the silicon oil may include polydimethylsiloxane and methylsiloxane. Also, the liquids may include poly-alpha-olefins (PAO's), polyol esters, glycols, glycerols and the like. In an exemplary embodiment, the fluid includes polyvinylpyrrolidone, glycerol, and a dye.

The high surface energy fluid may further include one or more solvents selected from water, silicone fluids, cyclosiloxanes, polydimethyl siloxanes, glycols, lactones, carbonates, alcohols, carbamates, lactates, pyrrolidones, lactams, ketones, acetals, ketals, esters, ethers, polyols, ureas, carbonates, sulfones, sulfoxides, amides, amines, imines, nitriles, halogenated, thio, or nitro compounds, aldehydes, poly-alpha-olefins, polyalkylene glycols, UV monomers or oligomers, glycol ethers, glycol ether esters, ether alcohols, aliphatic alcohols, chlorinated hydrocarbons, dodecane, hexane, sulfolane, pyrrolidines, tetradecane, mineral oil, castor oil, castor oil derivatives, polar aprotics, acetates, plasticizers, glycerol or mixtures thereof. In an exemplary embodiment the solvent may be glycerol. In another exemplary embodiment, the solvent may be silicone oil.

The fluids may also include additional one or more additives that can affect their properties. For example, the fluids may include at least a rheology modifier. The fluids may include at least a plasticizer. The fluids may include at least a surfactant. The fluids may include at least a dispersant. The fluids may include at least a synergist. The fluids may include at least a pigment. The fluids may include at least a polymeric dye. The fluids may include at least a dye.

The rheological modifier may be polymers that are soluble in the selected solvent. The rheological modifier may be polymers that are partially-soluble in the selected solvent. The rheological modifier may be materials that are insoluble in the selected solvent. It should be noted that the rheological modifiers affect the viscosity and viscoelasticity of the fluid and thus may have an affect on the relaxation time of the fluid. Non-limiting examples of rheological modifiers are from classes of polysaccharides, polyacrylic acids, vegetable gums, collagen, polyurethane, polyols, polyvinylpyrrolidone, ethylene oxide, polysiloxane, modified clays and silicates, various elastomers (e.g., polybutadiene or silicone rubber), alkanolamides, fatty acid amides (e.g., coco monoethanolamide, oleic acid diethanolamide or linoleic acid diethanolamide), sodium or potassium alginate, or vinyl pyrrolidone/vinyl acetate. Examples of rheological modifiers include: PVP K series. In another example the rhological modifiers include PVP K-60. In yet another example the rheological modifiers may include: K-90, ASE-60 (an acrylic associative thickener), Gantrez AN series poly(methylvinyl ether/maleic anhydride), Laponite RD (hydrous sodium lithium magnesium silicate), Polyox series (high MW polymers of ethylene oxide), UCAR Polyphobe (alkali soluble urethane modified associative thickener), Xantham gums such as Rhodopol (R. T. Vanderbilt), Natrosol (Hercules) (hydroxyethylcellulose), Bentone series (modified clay), Aqualon (carboxymethylcellulose), and Klucel (hydroxypropylcellulose). In an exemplary embodiment, the rheological modifier is a silicone elastomer. In an alternative embodiment, the rheological modifier is polyvinylpyrrolidone.

Plasticizers are additives that increase the plasticity or fluidity of the material to which they are added. The plasticizer may be selected from, and not limited to abietates, adipates, alkyl sulfonates, azelates, benzoates, dibenzoates, chlorinated paraffins, citrates, vegetable based plasticizers including epoxidized soybean oil, linseed oil and tallates, glycol ethers and ester, glutarates, hydrocarbon oils, isobutyrates, oleates, pentaerythritol derivatives, phosphates, phthalates, and polymeric plasticizers, ricinoleates, sebacates, sulfonamides, superplasticizers such as acrylic acid-based polycarboxylate, beta-naphthalene sulfonate and polymelamine sulfonate, tri and pyromellitates, biphenyl derivatives, calcium stearate, difurans, fluorine-containing plasticizers, hydroxybenzoic acid esters, isocyanate adducts, malonates, multi-ring aromatic compounds, natural product derivatives, nitriles, siloxane based, tarbased products, thioeters, and blends.

The surfactant may be any anionic, cationic, catanionic, zwitterionic (amphoteric), and non-ionic surfactant or any combinations thereof. Non-limiting examples include sulfonates, phosphonates, polyethylene oxides, polypropylene oxides, and polybutylene oxides containing any functional groups, and block and random co-polymers thereof; alkyl, aryl, and alkylaryl amines such as primary, secondary, tertiary, and quaternary amines and polyamines; pyrrolidones, naphthalene condensates, alkynes, carboxylic acids, alcohols, polyols, and any combinations thereof. The surfactant may be synthetic or natural.

The dispersant may be selected from the following classes: anionic, cationic, zwitterionic (amphoteric), and non-ionic polymers or oligomers that are block, random, comb, grafted, dendritic polymers or co-polymers selected from the group of: polyalkylene oxides such as polyethylene oxide, polypropylene oxide, or polybutylene oxide, polyamide, polyester, polyacrylate, polyethylenimine, polyether amine, polyvinyl alcohol, polyvinylacetate, polyvinylpyrrolidone, polyvinyloxazolidone, polyvinylmethyloxazolidone, polystyrene, polyepoxide, polyurethane, polyurea, polyvinyl halogen. Exemplary, commercially available dispersants include: Solsperse (Noveon), Tegosperse (Evonik), EFKA (BASF), and Disperbyk (BYK Chemie).

Generally, a synergist is a surface modifier that allows for a dispersant to adsorb to the particle and improve the dispersion stability of the particles in the medium that they are dispersed in. The synergists may include for example, sulfonic acid, metal salt of sulfonic acid, salt of sulfonic acid with primary, secondary, tertiary, and quaternary amines; sulfonamide, phthalimidomethyl, arylmethyl, alkyl amines, carboxylic acids, salts, amides and esters of carboxylic acids; carbonyl, amidomethyl, alkylaminomethyl, arylalkyloxy, phenylthio and phenylamino derivatives of azo, metal complex, benzimidazolone, azomethine, methane, anthraquinone, phthalocyanine, perinone, perylene, diketopyrrolopyrrole, indigo, thioindigo, dioxazine, isoindoline, isoindolinone, iminoisoindoline, iminoisoindolinone, quinacridone, flavanthrone, indanthrone, anthrapyrimidine, quinophthalone, isoviolanthrone, and pyranthrone, or any mixtures thereof. The synergist may also be any direct, acid, basic (cationic), reactive, vat, sulfur, solvent, food, mordant, natural, and disperse dye, and their derivatives, or any combination thereof. The synergist may also be a complex of any anionic dye with any cationic dye. The synergist may be used for pigment surface modification to stabilize pigment particles in the fluid, improve rheological properties, decrease interfacial tension, and to increase conductivity of the fluid.

The color of the fluid or fluids is not limited and may be selected in accordance to a desired function or appearance. The colored fluid may be tinted with a pigment or a dye. This allows the colored fluid to be visible from the upper and/or lower substrates. The colored fluid may also be the same or different color of a mask portion provided over the substrates. The dye may be used as a colorant and as a shader, for pigment surface modification to disperse and stabilize pigment particles in the fluid, for improvement of rheological properties, and/or for adjustment of interfacial tension and conductivity of the fluid.

The pigment may be organic. The pigment may be inorganic. The pigment may be a combination of inorganic and organic compounds. Typical pigments include azo, azomethine, methane, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine, quinophthalone, carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, derivatives thereof, mixtures thereof, and solid solutions thereof.

Non-limiting examples of organic pigments used in the experimentations may include: C.I. Pigment Black 1, 2, 3, 31, and 32; C.I. Pigment Green 7, 36, 37, 47, 54, and 58; C.I. Pigment Blue 15:1, 15:2, 15:3, 15:4, 15:6, 16, 21, 22, 60, 64, 65, 75, and 76; C.I. Pigment Violet 19, 23, 29, 31, 33, and 37; C.I. Pigment Red 122, 123, 144, 149, 166, 168, 170, 171, 175, 176, 178, 179, 180, 183, 189, 190, 192, 196, 202, 208, 209, 214, 216, 220, 221, 224, 226, 242, 248, 254, 255, 260, 264, and 271; C.I. Pigment Orange 36, 40, 43, 51, 60, 61, 62, 64, 66, 69, 71, 72, 73, and 77; C.I. Pigment Yellow 24, 74, 83, 93, 94, 95, 108, 109, 110, 120, 123, 138, 139, 150, 151, 155, 167, 170, 171, 173, 174, 175, 180, 181, 185, 192, 193, 194, 199, 213, and 218.

Non-limiting examples of inorganic pigments include: Pigment Black 6, 7, 9, 11, 12, 14, 15, 22, 26, 27, 28, 29, 30, 33, 34 and 35; C.I. Pigment Green 18, 20, 21, and 22; C.I. Pigment Blue 27, 30, and 73; C.I. Pigment Red 265 and 275; C.I. Pigment Yellow 38, 40, 53, 119, 157, 158, 160, 161, 162, and 184; C.I. Pigment White 4, 5, 6, 6:1, 7, 8, 9, 10, 12, 13, 14, 15, 18, 18:1, 19, 21, 22, 23, 24, 25, 26, 27, 28, 32, 33, and 36.

The dye may be any conventional dye selected from group of direct, acid, basic (cationic), reactive, vat, sulfur, solvent, food, mordant, fluorescent, natural, and disperse dye, or any combinations thereof. The dye may also be a complex of any anionic dye with any cationic dye.

The dye may further be modified. The dye may be oligomeric. The dye may be polymeric. A modified dye preferably is defined as a conventional or specially synthesized dye comprising one or multiple additional functional groups connected directly or through linking groups to one chromophore by means of covalent or ionic bonds with total molecular weight lower than 1,500. A modified dye can also be a complex of two or more dyes connected to each other through covalent, ionic, or hydrogen bonds. These dyes can or cannot have additional substituting groups; they can carry opposite charges and connect to each other directly or have the same charge and be connected through a third non-colored component having an opposite charge.

An oligomeric dye preferably defined as a compound comprising at least one chromophore attached to one or multiple chains directly or through linking groups by means of covalent or ionic bonds with total molecular weight in a range 1,500-5,000.

An exemplary polymeric dye may include a compound comprising at least one chromophore attached to one or multiple chains directly or through linking groups by means of covalent or ionic bonds with total molecular weight higher than 5,000.

The dye may also contain any chromophore such as azo and azo condensed, metal complexes, benzimidazolones, azomethines, methines such as cyanines, azacarbocyanines, enamines, hemicyanines, streptocyanines, styryls, zeromethines, mono-, di-, tri-, and tetraazamethine; caratenoids, arylmethane such as diarylmethanes and triarylmethanes; xanthenes, thioxanthenes, flavanoids, stilbenes, coumarins, acridenes, fluorenes, fluorones, benzodifuranones, formazans, pyrazoles, thiazoles, azines, diazines, oxazines, dioxazines, triphenodioxazines, phenazines, thiazines, oxazones, indamines, nitroso, nitro, quinones such as hydroquinones and anthraquinones; rhodamines, phthalocyanines, neutrocyanines, diazahemicyanines, porphirines, perinones, perylenes, pyronins, diketopyrrolopyrroles, indigo, indigoids, thioindigo, indophenols, naphthalimides, isoindolines, isoindolinones, iminoisoindolines, iminoisoindolinones, quinacridones, flavanthrones, indanthrones, anthrapyrimidines, quinophthalones, isoviolanthrones, pyranthrones and any combinations of them.

Modified dyes may contain any type of one or more multiple linking groups and/or functional groups for polar and non-polar fluids. Oligomeric dyes may contain any type of one or more multiple linking groups and/or functional groups for polar and non-polar fluids. Polymeric dyes may contain any type of one or more multiple linking groups and/or functional groups for polar and non-polar fluids. Non-limiting examples of linking and functional groups are sulfo-, sulfamido-, carboxy-, carboxamido-, urea-, thiourea-, urethane-, azo-, keto-, oxy-, oxyalkyl-, thio-, amino-, aminoalkyl-, phosphate-, monohalotriazolo-, dihalotriazolo-, vinyl sulfono-, phenylamino sulfono-group, and any combinations thereof.

Non-limiting specific examples of functional groups are alkyl, polyalkyl, alkylene glycol, polyalkylene glycol, alkylaryl, polyethylenimine, polyester, polyurethane, polyhaloalkyl, polyepoxy, polyurea, polyamide, polyacryl, polystyrene, polycarbonate, and any random or block copolymers thereof, and any combinations thereof.

An exemplary reversible piezochromic device may be manufactured by selecting an upper and lower substrate of the system, each substrate having a predetermined surface energy, and selecting at least a high surface energy fluid. A polymeric coating may be applied to a surface of at least one of the upper and lower surfaces to modify the surface energy. The coating creates a pattern of higher surface energy and lower surface energy. The lower surface energy area may surround the higher surface energy area, or the higher surface energy area may surround the lower surface energy area. A fluid is selected to have preferred wetting properties with the higher surface energy area of the substrate surface before a force is applied to the system. The fluid may further include a pigment or a dye so as to have a color that can be easily viewed by a user.

A mask may be printed over a transparent substrate to create an area that can hide or change the colored, high surface energy fluid during an equilibrium state but exposes the fluid during an activation state. In such an exemplary embodiment, as discussed in more detail below, the mask may be printed over the higher surface energy area of the substrate while the lower surface energy area remains exposed. The mask may be of a different color or a different shade than the high surface energy fluid. The mask can serve as an indicator of when the colored, high surface energy fluid has spread outside the outer periphery of the mask. The mask can be any shape or logo suitable for the use of the system. In the example shown in FIG. 5 the mask is button-shaped.

As described in further detail below, when a force is applied to the piezochromic system, the first fluid, being a high surface energy fluid, and which may be colored, spreads from the higher surface energy area that may be covered by the mask to the lower surface energy area. As such, the fluid can visually signal that a pressure force has been applied to the system. Because, as discussed above, the fluid is selected to have preferred wetting properties with the higher surface energy area, however, once the pressure force is removed, the fluid will automatically recede to the higher surface energy area. The time the fluid takes to return to such covered region is the relaxation time. The relaxation time may be controlled by factors such as the surface energy differences, the properties of the fluid, the relationship in volume of the cavity and the fluid and other factors as discussed previously. As such, the piezochromic system may be designed to indicate to a user that a pressure has been applied to the system for a predetermined amount of time, thereby functioning as a switch.

An exemplary method of using a reversible piezochromic system is described below. A force, such as mechanical pressure, is applied to the system. The rate of relaxation of the high surface energy fluid after the force has been removed can be controlled.

As shown in FIG. 1B, when a force is applied to a substrate, the fluid spreads from the higher surface energy area 6 to the lower surface energy area 7. The activated state is present when a mechanical force is applied to the system. The force may be applied mechanically. The force can be applied at a direction normal to the surface of the system. Alternatively, the force may be applied tangential (i.e., shear with a normal component) to the surface of the system. The magnitude of the applied force should be sufficient enough to disturb the state of equilibrium, and thus, causing a change in appearance of the reversible piezcochromic system. Similarly, the duration of the applied force should be sufficient enough to disturb the state of equilibrium, and thus, causing a change in appearance of the reversible piezcochromic system.

Figure 2:
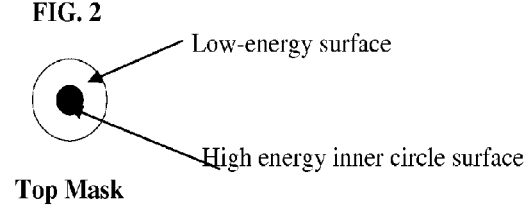
FIG. 2 illustrates the inside surface of the top substrate of an exemplary piezochromic system having a mask on the outside surface.

As shown in FIG. 2, the mask covers a predetermined inner periphery of the outer surface of the substrate. An inner surface of the substrate, forming a portion of the cavity of the system includes areas of higher surface energy and lower surface energy with respect to each other. The area of the inner substrate disposed beneath the mask is a higher surface energy area. In an exemplary embodiment, the higher surface energy area may be either hydrophilic or hydrophobic. The higher surface energy may also have a lower contact angle with the high surface energy fluid as compared to the lower surface energy area. The area surrounding the mask generally is a lower surface energy area of the inner substrate. The lower surface energy area may be hydrophobic.

Figure 3:
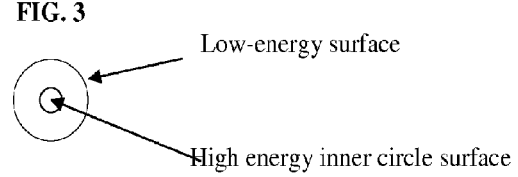
FIG. 3 illustrates the inside surface of the bottom substrate of an exemplary piezochromic system.

FIG. 3 illustrates the inside surface of the bottom substrate of the system. The higher surface energy area of the inner substrate is surrounded by the lower surface energy area of the inner substrate. In another embodiment, the lower surface energy area is surrounded by the higher surface energy area. In this embodiment, no mask is provided on the bottom substrate. However, in another embodiment, the bottom substrate may contain a mask. In a further embodiment, both the upper and lower substrates may have a mask. Alternatively, the mask can be included inside the substrate or substrates. This may be performed when the substrate is transparent. In a further exemplary embodiment, the mask could be on the inner surface of the substrate or substrates and may be incorporated as part of the surface energy patterning of the inner surface of the substrates and may be incorporated as part of the surface energy patterning of the inner surface of the substrates.

Figure 4:
FIG. 4 illustrates the inside surface of the bottom substrate of an exemplary piezochromic system with a colored liquid in the center.

FIG. 4 illustrates the inside surface of the lower substrate. As shown, the colored high surface energy fluid is maintained in an inner area of the lower substrate. The inner area is defined as a higher surface energy area.

Figure 5:
FIG. 5 illustrates the top view of an exemplary piezochromic system having a colored fluid underneath the mask within the interior cavity and a mask printed on the outside surface of the top substrate.

FIG. 5 illustrates a composite structure of the top piece attached to the bottom piece (not shown). In this embodiment, the mask covers the high surface energy fluid.

Figure 6:
FIG. 6 illustrates a top view of an exemplary piezochromic system at a time $t_0$ after a force has been applied.

FIG. 6 is illustrative of a time to when mechanical pressure is applied to the system. As seen from the upper substrate, once a mechanical force is applied to the system, the high surface energy fluid spreads inside the cavity from an equilibrium state to an active state.

Figure 7:
FIG. 7 illustrates a top view of an exemplary piezochromic system at a time $t_1$, where $t_1 > t_0$

FIG. 7 is illustrative of a time $t_1 > t_0$ when the mechanical force is removed. By so doing, the high surface energy fluid begins to recede back to the equilibrium state. As shown, high surface energy fluid is still visible beyond the periphery of the mask.

Figure 8:
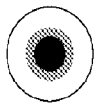
FIG. 8 illustrates a top view of an exemplary piezochromic system at a time $t_2 > t_1$.

FIG. 8 is illustrative of a time $t_2 > t_1$. Here, the colored liquid has receded even more toward the equilibrium state. Some high surface energy fluid is still visible beyond the periphery of the mask.

Figure 9:
FIG. 9 illustrates a top view of an exemplary piezochromic system at a time $t_3 > t_2$.

FIG. 9 is illustrative of a time $t_3 > t_1$. Here, the high surface energy fluid has substantially migrated to the equilibrium state.

Figure 10:
FIG. 10 illustrates a top view of an exemplary piezochromic system at time $t_4 > t_3$.

FIG. 10 is illustrative of a time $t_4 > t_3$. In this illustration, the high surface energy fluid has completely returned to the equilibrium state. Since the mask covers the equilibrium region, the high surface energy fluid is hidden from sight.

The piezochromic device may be used for a wide variety of applications. Examples include applications for toys, games, timing devices, equipment assembly tolerance indicators, decorative, safety or security features. The use of pressure sensitive devices in the form of films or shrink sleeves may be ideal for next generation packaging design.

In another example, an anti-tampering device may comprise the reversible piezochromic system. The reversible piezochromic system changes color when the device has been tampered with. In a further example, a container may comprise the reversible piezochromic system. The container may be useful in any technical field. The container may be a fluid container. In yet a further example, a memory device may comprise the reversible piezochromic system. Further, a storage device may comprise the reversible piezochromic system. The storage device may be useful in any technical field.

Piezochromic timing systems may also be used in consumer products and consumer packaging. The use of such a device can be incorporated into pharmaceutical packaging. The use of such a device can be incorporated into over-the counter medication packaging. The packaging may be a bottles. The packaging may be a tube. The packaging may be a jar. The packaging may be a lid. The invention can be used for single or multi-use applications. In addition, the device may be used as an overt security feature to protect sensitive documents or finished goods from unwarranted handling or forgery.

Examples of specific applications pharmaceutical & consumer packaging—wrappers, vial, boxes, bags (IV & others), inhalers, dispensers, blister packs, sprayers, tubing, pouches, where timing devices can be used to clearly identify when to apply or take a medication or product or to remove a cleaner or conditioner or dye from a surface or other application.

The piezochromic device may be used for a wide variety of applications. Examples include applications designed for decorative or security features. The use of pressure sensitive logos in the form of films or shrink sleeves can be ideal for next generation packaging design.

In addition, the device may be used as an overt security feature to protect sensitive documents or finished goods from unwarranted handling or forgery.

The piezochromic device may also be used as a reversible pressure sensor. One example includes a pressure sensitive film to indicate sudden changes in pressure. As mentioned above, this could be useful, for example, as a direct indicator for boundaries used on a sports court such as in tennis. The pressure sensitive film may also be used to determine whether or not an object has come into contact with the boundary.

Another example would be the use of this device to indicate variable pressure within a flexible object, such as beverage container.

The piezochromic device may be used as a reminder, such as when a drug needs to be dispensed on a regular schedule, but not more often. Pressure on the device may dispense a drug while simultaneously spreading the fluid and generating a visual signal. After a predetermined time the fluid will have returned to its equilibrium state. While the fluid is not in the equilibrium state it will be evident that the drug has been dispensed within the predetermined time and should not be dispensed again until the system has returned to its original appearance.

Specific devices that use the reversible piezochromic system are injection devices for proteins. Proteins include, but are not limited to, human growth hormones (HGH) and insulin.

The following examples illustrate specific aspects of the present invention and are not intended to limit the scope of the invention. Examples 1 and 3 discuss a slow acting device. Example 2 discusses a fast acting device.

Example 1

A slow acting device includes an uncured, non film forming liquid enclosed within the device. The liquid consists of a silicone oil such as 538,800 cPs methylsiloxane, a second silicone oil such as a higher viscosity 978,000 cPs polydimethylsiloxane, a colorant, such as C. I. Pigment Red 254 dispersed in a silicone oil, and a silicone elastomer.

The device of FIG. 1 and Table 1 also includes two transparent patterned substrates adhered around the periphery with an acrylic pressure sensitive adhesive with an internal PET layer. The adhesive assembly also acts as the spacer layer of the device and can be sealed or partially sealed.

The device also includes a printed, colored image or mask on the substrate surface(s) over a higher surface energy area or a hydrophilic area of the substrate to cover the colored fluid when in the equilibrium state.

A lower energy outer ring region is formed by application of a fluoropolymer around a higher energy inner circle region of the PET substrate, which is manufactured with an acrylic polymer layer on the surface of the substrate; a fluoropolymer and volatile solvent is applied in the ring pattern and the solvent is evaporated. The dried fluoropolymer is heated at 100° C. for 30 minutes to provide a transparent fluoropolymer coating with good adhesion and uniform surface. The contact angle of deionized water on the higher energy PET substrate ranges from 68°-72°. The lower energy fluoropolymer coating ranges from 102°-110°.

The timing of the device is dependent upon the viscoelastic properties of the colored liquid, the sealed or partially sealed spacer layer regulating internal pressures, the volume of the colored fluid, the dimensions of the device, the surface energy differences between the lower and higher surface energy areas, temperature and pressure, and the force and force area of mechanical force exerted on the device surface.

The device, when inactivated or activated, is independent of spatial orientation due the surface energy forces exceeding gravitational forces.

Example 2

A fast acting device includes an uncured, non film forming liquid enclosed within the device. The liquid consists of 15% polyvinylpyrrolidone, 85% glycerol, 4% Direct Blue 199 dye solution. Preferably, 3.5 mg of the liquid was added to the inner circle. See FIG. 4.

A 10 mm circle is removed from an acrylic adhesive sheet, which is then adhered to a PET sheet. A pattern of low surface energy is created within the circle by application of a fluorocarbon solution. A fluoropolymer and volatile solvent is applied in the ring pattern and the solvent is evaporated. The fluoropolymer is heated at 100° C. for 30 minutes to provide a transparent fluoropolymer coating with good adhesion and uniform surface. The contact angle of deionized water on the higher energy PET substrate ranges from 68°-72° and on the lower energy fluoropolymer coating ranges from 102°-110°.

The pattern is a fluorocarbon ring surrounding a circle of untreated PET (i.e., higher surface energy area). Preferably, the inner circle has a diameter of 4.6 mm. An indicator mask is printed over the higher surface energy area or hydrophilic portion of the substrate surface. This provides an indication of when the liquid recedes into the higher surface energy area or hydrophilic portion. The mask can be printed with a color that contrasts the color of the liquid.

The top piece with the same fluoropolymer applied n the ring pattern attached to the bottom piece, forming a cavity and containing a fluid therebetween, with an adhesive. The depth of the cavity is 1.0 mm. This is illustrated in FIG. 5, where there is a cell containing a liquid, and an indicator mask printed with a color that contrasts the color of liquid being a high surface energy fluid. In this preferred example, the mask is printed black and the liquid is tinted blue.

The relaxation time of the system depends upon the viscoelastic properties of the colored liquid, the sealed or partially sealed spacer layer regulating internal pressures, the volume of the colored liquid, the dimensions of the device, the delta surface energy between lower and higher surface energy areas, temperature and pressure, and the force and force area of force exerted on the device surface.

The system, when inactivated or activated, is independent of spatial orientation due to the surface energy forces exceeding gravitational forces.

Example 3

A slow acting system includes an uncured, non film forming liquid enclosed within the system with the geometry of Example 1. The liquid includes of a silicone oil such as 586,800 cPs polydimethylsiloxane, a second silicone oil such as a higher viscosity 978,000 cPs polydimethylsiloxane, a colorant, such as C. I. Pigment Red 254 dispersed in a silicone oil, and a silicone elastomer.

The system also consists of two transparent patterned substrates adhered around the periphery with an acrylic pressure sensitive adhesive with an internal PET layer. The adhesive assembly also acts as the spacer layer of the device and can be sealed or partially sealed.

The device also consists of a printed colored image on the substrate surface(s) over the hydrophilic area or higher surface energy area of the substrate to act as a mask to cover the colored liquid when in an equilibrium state.

A lower energy outer ring region is formed by application of a reactive fluorocarbon coating around a higher energy inner circle region of the PET substrate, which is manufactured with an acrylic polymer layer on the surface of the substrate; a comprising a reactive fluorocarbon, a reactive urethane acrylate, and a photoinitiator were screen printed and cured with UV light in a nitrogen atmosphere. The contact angle of deionized water on the higher energy PET substrate ranges from 68°-72° and on the lower energy fluoropolymer coating ranges from 100°-110°.

The timing of the device is dependent upon the viscoelastic properties of the colored liquid, the sealed or partially sealed spacer layer regulating internal pressures, the quantity of the colored liquid, the dimensions of the device, the surface energy between lower and higher surface energy areas, temperature and pressure, and the force and force area of mechanical force exerted on the device surface.

The device, when inactivated or activated, is independent of spatial orientation due the surface energy forces exceeding gravitational forces It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A reversible piezochromic system comprising:
   a first substrate;
   a second substrate;
   a cavity defined by an inside surface of said first substrate and an inside surface of said second substrate; and
   at least a first fluid disposed within said cavity,
   wherein said first fluid is colored
   wherein upon application of a force to the system the first fluid spreads from an equilibrium state to an active state, and upon relief of said force from said system the first fluid returns to said equilibrium state;
   wherein the inner surface of at least one of said first substrate or second substrate comprises a patterned inner surface having at least a higher surface energy area and at least a lower surface energy area; wherein said patterned inner surface of at least one of said first substrate or said second substrate is in contact with the first fluid, the first fluid having a viscosity ranging between 100,000 cPs to 5,000,000 cPs at a temperature between 5° C. and 40° C.

2. The reversible piezochromic system according to claim 1, wherein said first or said second substrate comprises an opaque, transparent or semi-transparent surface.

3. The reversible piezochromic system according to claim 1, further comprising an adhesive between said first and second substrates.

4. The reversible piezochromic system according to claim 1, further comprising: a second fluid disposed within said cavity.

5. The reversible piezochromic system according to claim 4, wherein the second fluid is a gas.

6. The reversible piezochromic system according to claim 4, wherein the surface energy of the first fluid is higher than the surface energy of the second fluid.

7. The reversible piezochromic system according to claim 6, further comprising: a third fluid disposed within said cavity.

8. The reversible piezochromic system according to claim 1, further comprising at least one spacer disposed between said first and second substrates.

9. The reversible piezochromic system according to claim 1, further comprises a polymeric coating on the inside surface of at least one of said first or said second substrate.

10. The reversible piezochromic system according to claim 9, wherein said polymeric coating is selected from the group consisting of: fluoropolymers, silicone polymers, polyacrylates, polymethacrylates, polyvinyl ethers, polyurethanes, polyureas, polypropylene, polyethylene, polyester, polyimide, polyvinyl cellulose, polyvinyl chloride, polycarbonate, polyethylene terephthalate (PET), polyamide, polyimide, surface treated polymers, silane treatment, plasma treated polymers, polymers made in-situ from monomers and/or oligomers, surface energy modifiers, and mixtures thereof.

11. The reversible piezochromic system according to claim 1, wherein the higher surface energy area has a contact angle with deionized water ranging between 0° to 84°.

12. The reversible piezochromic system according to claim 1, wherein the lower surface energy area has a contact angle with deionized water ranging between 85° to 180°.

13. The reversible piezochromic system according to claim 1, wherein the first fluid has a relaxation time that ranges between 45 minutes and 48 hours.

14. The reversible piezochromic system according to claim 1, wherein the first fluid comprises at least one solvent selected from: water, silicone fluids, cyclosiloxanes, polydimethylsiloxanes, methylsiloxanes, glycols, lactones, carbonates, alcohols, carbamates, lactates, pyrrolidones, lactams, ketones, acetals, ketals, esters, ethers, polyols, ureas, carbonates, sulfones, sulfoxides, amides, amines, imines, nitriles, halogenated, thio, or nitro compounds, aldehydes, poly-alpha-olefins, polyalkylene glycols, UV monomers or oligomers, glycol ethers, glycol ether esters, ether alcohols, aliphatic alcohols, chlorinated hydrocarbons, dodecane, hexane, sulfolane, pyrrolidines, polyvinylpyrrolidones, tetradecane, mineral oil, castor oil, castor oil derivatives, polar aprotics, acetates, glycerol and mixtures thereof.

15. The reversible piezochromic system according to claim 14, wherein the first fluid further comprises at least one colorant.

16. The reversible piezochromic system according to claim 1, wherein the first fluid comprises at least one of: solvents, rheology modifiers, plasticizers, surfactants, dispersants, synergists, pigments, dyes and polymeric dyes.

17. The reversible piezochromic system according to claim 1, which can be used in a timing device, tape, decorative tile, security anti-tampering device, container, package, memory device, or a storage device.

18. The reversible piezochromic system according to claim 1, further comprising a mask which covers a higher surface energy area or a lower surface energy area of at least one of the first and second substrates compared to the surface energy of the remainder of the substrate(s) not covered by the mask.

19. The reversible piezochromic system according to claim 1, wherein the cavity is defined by said first substrate, said second substrate, and at least one spacer, wherein the spacer is disposed between the substrates.

20. A method of making a reversible piezochromic system comprising:
   selecting a first substrate and a second substrate wherein an inner surface of at least one of the first and second substrates has a defined surface energy;
   encapsulating at least a first fluid within a cavity formed by the first and second substrates; and
   wherein said first fluid has a surface energy that is greater than a surface energy of the inner surface of the first and second substrates;
   wherein said first fluid is colored
   wherein upon application of a force to the system the first fluid spreads from an equilibrium state to an active state, and upon relief of said force from said system the first fluid returns to said equilibrium state;
   wherein the inner surface of at least one of said first substrate or second substrate comprises a patterned inner surface having at least a higher surface energy area and at least a lower surface energy area; wherein said patterned inner surface of at least one of said first substrate or said second substrate is in contact with the first fluid, the first fluid having a viscosity ranging between 100,000 cPs to 5,000,000 cPs at a temperature between 5° C. and 40° C.

21. The method according to claim 20, further comprising: patterning said inner surface of at least one said first and second substrates.

22. The method according to claim 21, wherein said patterning further comprises:
applying a polymeric coating on said inner surface of at least one of said first and second substrates.

23. The method according to claim 20, wherein the first fluid comprises at least one colorant.

24. A method of using the reversible piezochromic system according to claim 1 comprising: applying a force to the piezochromic system to cause a first fluid to spread; and discontinuing the application of force for a sufficient time to allow the fluid to at least partially contract.

25. A reversible piezochromic system comprising:
a first substrate;
a second substrate;
a cavity defined by an inside surface of said first substrate and an inside surface of said second substrate; and
a first and second fluid disposed within said cavity, wherein the surface energy of the first fluid is higher than the surface energy of the second fluid,
wherein at least one of said first or second fluids is colored
wherein upon application of a force to the system the first fluid spreads from an equilibrium state to an active state, and upon relief of said force from said system the first fluid returns to said equilibrium state.

26. The reversible piezochromic system according to claim 25, wherein the inner surface of at least one of said first substrate or second substrate further comprises a patterned inner surface having at least a higher surface energy area and at least a lower surface energy area.

27. The reversible piezochromic system according to claim 26, wherein said patterned inner surface of at least one of said first substrate or said second substrate is in contact with the first fluid, the first fluid having a viscosity ranging between 100 cPs to 5,000,000 cPs at a temperature between 5° C. and 40° C.

28. The reversible piezochromic system according to claim 27, wherein said patterned inner surface of at least one of said first substrate or said second substrate is in contact with the first fluid, the first fluid having a viscosity ranging between 100 cPs to 1,000,000 cPs at a temperature between 5° C. and 40° C.

29. The reversible piezochromic system according to claim 28, wherein the first fluid has a relaxation time that ranges between 10 seconds and 45 minutes.

* * * * *